(12) United States Patent
Hamaguchi et al.

(10) Patent No.: US 11,312,267 B2
(45) Date of Patent: Apr. 26, 2022

(54) SEAT FRAME FOR SADDLED VEHICLE

(71) Applicant: Honda Motor Co., Ltd., Tokyo (JP)

(72) Inventors: Daiki Hamaguchi, Kumamoto (JP); Keita Mikura, Kumamoto (JP); Takayuki Haramoto, Kumamoto (JP); Takumi Kosuga, Kumamoto (JP); Yuki Kanemura, Kumamoto (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/279,879

(22) Filed: Feb. 19, 2019

(65) Prior Publication Data

US 2019/0299815 A1 Oct. 3, 2019

(30) Foreign Application Priority Data

Mar. 28, 2018 (JP) .............................. JP2018-062896

(51) Int. Cl.
*B60N 2/68* (2006.01)
*B60N 2/02* (2006.01)
*B60N 2/40* (2006.01)

(52) U.S. Cl.
CPC ............ *B60N 2/0284* (2013.01); *B60N 2/40* (2013.01); *B60N 2/682* (2013.01)

(58) Field of Classification Search
CPC ........ B60N 2/0284; B60N 2/40; B60N 2/682; B62J 1/08; B62J 1/14; B62J 7/04
See application file for complete search history.

(56) References Cited

U.S. PATENT DOCUMENTS 5,284,221 A * 2/1994 Warne ................... B62K 11/04
180/219
5,704,442 A * 1/1998 Okazaki ................. B62K 11/04
180/219

(Continued)

FOREIGN PATENT DOCUMENTS

CN 2422219 Y 3/2001
CN 201305092 Y 9/2009

(Continued)

OTHER PUBLICATIONS

Indian Office Action for Indian Application No. 201914002647, dated Apr. 27, 2020, with an English translation.

*Primary Examiner* — Philip F Gabler
(74) *Attorney, Agent, or Firm* — Birch, Stewart, Kolasch & Birch, LLP (57) ABSTRACT

Provided is a seat frame for a saddled vehicle capable of increasing the coupling rigidity at the separable rear end and having aesthetic aspect. A seat frame of a vehicle body frame includes a front part fixed to the vehicle body frame and a rear part that can be disconnected from the front part, the front part and the rear part being separated at a rear part of the vehicle body. The front part and the rear part are fixed with a fastening member that engages from the inside of the vehicle width direction. The front part has a hollow rear end, and the rear part includes a solid engagement part at the front end. The fastening member as a bolt penetrates through the lateral wall at the rear end to be screwed with the engagement part inserted into the rear end. The rear part includes the engagement part and a pipe member to be connected to a rear part of the engagement part.

12 Claims, 8 Drawing Sheets

(56) References Cited

U.S. PATENT DOCUMENTS

| | | | | |
|---|---|---|---|---|
| 6,846,018 B2* | 1/2005 | Dennert | ................. | B62K 19/00 |
| | | | | 180/219 |
| 8,464,827 B2* | 6/2013 | Tsumiyama | ......... | B62D 23/005 |
| | | | | 180/311 |
| 8,616,324 B2* | 12/2013 | Chipp | ........................ | B62J 1/12 |
| | | | | 180/311 |
| 8,727,058 B2* | 5/2014 | Nakano | ................. | B62K 11/10 |
| | | | | 180/219 |
| 8,851,496 B2* | 10/2014 | Hedtke | ................. | B62K 11/04 |
| | | | | 280/281.1 |
| 9,623,929 B2* | 4/2017 | Hagimoto | .............. | B62K 11/04 |
| 2005/0151346 A1* | 7/2005 | James | .................... | B62K 25/02 |
| | | | | 280/288 |
| 2010/0012415 A1 | 1/2010 | Hedtke | | |
| 2015/0000992 A1* | 1/2015 | Hagimoto | .............. | B62K 11/04 |
| | | | | 180/219 |
| 2017/0101151 A1 | 4/2017 | Koishikawa et al. | | |

FOREIGN PATENT DOCUMENTS

| | | |
|---|---|---|
| CN | 102464072 A | 5/2012 |
| CN | 102180212 B | 7/2013 |
| DE | 10 2008 030 390 A1 | 1/2009 |
| JP | 57-122494 U | 7/1982 |
| JP | 3-114984 A | 5/1991 |
| JP | 2013-129337 A | 7/2013 |
| JP | 2017-71376 A | 4/2017 |

\* cited by examiner

SEAT FRAME FOR SADDLED VEHICLE

CROSS-REFERENCE TO RELATED APPLICATIONS

This application claims the benefit of priority to Japanese Patent Application No. 2018-062896, filed on Mar. 28, 2018, the entire contents of which are hereby incorporated by reference.

BACKGROUND

1. Technical Field

The present invention relates to a seat frame for saddled vehicle, and more particularly relates to a seat frame for a saddled vehicle placed at a rear part of the vehicle body to support a seat, for example, on which a rider can sit.

2. Description of the Background

Conventional saddled vehicle includes a seat frame extending rearward from a rear part of the vehicle body frame. The seat frame supports a seat, for example, on which a rider can sit.

Japanese Patent Application Publication 2013-129337 A (hereinafter referred to as "Patent Literature 1") discloses a motorcycle having a vehicle body frame that supports a swing arm swingably. In this motorcycle, a part of the seat frame can be separated, and a rear cushion is attached to the separated part. This seat frame allows a user to assemble a selected appropriate attachment, and so can manufacture a motorcycle having a different space between the left and right rear cushions.

BRIEF SUMMARY

Some vehicles having a seat frame exposed from the vehicle body have a grab bar or a rear carrier at a rear end of the seat frame. In this case, a separable rear end of the seat frame as in Patent Literature 1 may be replaced with another part. This configuration, however, requires sufficient coupling rigidity as well as aesthetic aspect of the coupling part especially when the vehicle has a seat frame exposed from the body to be a part of the design. The seat frame of Patent Literature 1 is not enough for easy disconnection of the rear end of the seat frame or for the enhancement of aesthetic aspect of the coupling part.

To solve the problems of the conventional techniques, the present invention aims to provide a seat frame for a saddled vehicle capable of increasing the coupling rigidity at the separable rear end and having aesthetic aspect.

To achieve the aim, a first aspect of the embodiment provides a seat frame (SF) for a saddled vehicle (1) extending rearward of a vehicle body from a rear part of a vehicle body frame (F), the seat frame (SF) comprising:

a front part (A) fixed to the vehicle body frame (F);

a rear part (B) detachably attached to the front part (A), the rear part (B) separated from the front part (A) at a rear part of the vehicle body; and a fastening member (43) fixing the front part (A) and the rear part (B) by engaging from the inside of the vehicle width direction.

The seat frame for the saddled vehicle of the embodiment has a second aspect that the fastening member (43) includes a bolt, the front part (A) has a rear end (Ar) having a hollow structure, the rear part (B) includes an engagement part (39) having a solid structure at a front end of the rear part (B), and the fastening member (43) penetrates through a lateral wall (36b) at the rear end (Ar) to be screwed with the engagement part (39) inserted into the rear end (Ar).

The seat frame for the saddled vehicle of the embodiment has a third aspect that the rear part (B) includes the engagement part (39) and a pipe member (40, 40a) to be connected to a rear part of the engagement part (39).

The seat frame for the saddled vehicle of the embodiment has a fourth aspect that the rear end (Ar) of the front part (A) includes a pair of left and right rear ends (Ar), and the left and right rear ends (Ar) are joined via a cross plate (36) extending in the vehicle width direction.

The seat frame for the saddled vehicle of the embodiment has a fifth aspect that each rear end (Ar) of the front part (A) includes the lateral wall (36b) like a flat plate at one end of the cross plate (36) in the vehicle width direction, and a curved wall (44) that has a substantially semi-circular cross section and covers the lateral wall (36b) on the outside in the vehicle width direction, and each lateral wall (36b) has a through hole (36c), through which the fastening member (43) passes.

The seat frame for the saddled vehicle of the embodiment has a sixth aspect that the front part (A) includes a round pipe (F5), and the curved wall (44) is formed by removing a part of the round pipe (F5) on the inside in the vehicle width direction.

The seat frame for the saddled vehicle of the embodiment has a seventh aspect that the engagement part (39) has a flat part (39b) on the inside in the vehicle width direction, the flat part (39b) being formed by removing a part of a round-pillar shaped solid member.

The seat frame for the saddled vehicle of the embodiment has an eighth aspect that the cross plate (36) is a plate member having a flat center part (36a) extending in the vehicle width direction and the lateral walls (36b) extending downward from both ends of the center part (36a).

The seat frame for the saddled vehicle of the embodiment has a ninth aspect that a rear cushion support (37) is disposed in front of the rear end (Ar) of the front part (A), the rear cushion support (37) supporting an upper end of the rear cushion (18).

The seat frame for the saddled vehicle of the embodiment has a tenth aspect that the pipe member (40, 40a) of the rear part (B) has a diameter ($\phi 2$) smaller than a diameter ($\phi 1$) of the round pipe (F5) of the front part (A).

According to the first aspect, the seat frame (SF) of the saddled vehicle (1) extends rearward of the vehicle body from a rear part of the vehicle body frame (F), and the seat frame (SF) is separable into the front part (A) fixed to the vehicle body frame (F) and the rear part (B) that is detachably attached to the front part (A). The front part (A) and the rear part (B) are fixed with the fastening member (43) that engages from the inside in the vehicle width direction. In this way, the rear part of the seat frame can be disconnected from the front part, and so the rear part only can be easily replaced with a short frame with an emphasis on design or with a long frame with an emphasis on the carrying capacity. This can enhance the flexibility of design of the seat frame as compared with an integrally formed seat frame. Additionally, the fastening member including a bolt, for example, engages from the inside in the vehicle width direction. The fastening member therefore is hidden from the outside while exposing the separated part of the seat frame to the outside. This can enhance the aesthetic aspect of the saddled vehicle.

According to the second aspect, the fastening member (43) includes a bolt, the front part (A) has the rear end (Ar)

having a hollow structure, the rear part (B) includes an engagement part (39) having a solid structure at the front end, and the fastening member (43) penetrates through the lateral wall (36b) at the rear end (Ar) to be screwed with the engagement part (39) inserted into the rear end (Ar). In this way, the engagement part includes a solid member, with which the bolt is directly screwed, and this can increase the coupling rigidity between the front part and the rear part.

According to the third aspect, the rear part (B) includes the engagement part (39) and a pipe member (40, 40a) to be connected to a rear part of the engagement part (39). This can enhance the rigidity at the engagement part and can make the rear part lighter in weight. The rear part includes the pipe member that is easily shaped, and so the flexibility of design at the rear part increases.

According to the fourth aspect, the rear end (Ar) of the front part (A) includes a pair of left and right rear ends, and the left and right rear ends (Ar) are joined via a cross plate (36) extending in the vehicle width direction. This can increase the strength of the front part of the seat frame.

According to the fifth aspect, each rear end (Ar) of the front part (A) includes the lateral wall (36b) like a flat plate at one end of the cross plate (36) in the vehicle width direction and a curved wall (44) that has a substantially semi-circular cross section and covers the lateral wall (36b) on the outside in the vehicle width direction, and each lateral wall (36b) has a through hole (36c), through which the fastening member (43) passes. In this way, the cross plate makes up a part of the rear end, whereby the rigidity can increase while reducing the number of components.

According to the sixth aspect, the front part (A) includes a round pipe (F5), and the curved wall (44) is formed by removing a part of the round pipe (F5) on the inside in the vehicle width direction. In this way, the curved wall can be formed by simple machining of cutting of a part of the pipe frame, and so the number of man-hours can reduce.

According to the seventh aspect, the engagement part (39) has a flat part (39b) on the inside in the vehicle width direction, the flat part (39b) being formed by removing a part of a round-pillar shaped solid member. In this way, the flat part of the engagement part comes in a surface contact with the lateral wall of the cross plate, and this can increase the coupling rigidity of these parts fastened with a bolt more.

According to the eight aspect, the cross plate (36) is a plate member having a flat center part (36a) extending in the vehicle width direction and the lateral walls (36b) extending downward from both ends of the center part (36a). In this way, the cross plate as a single member has a function of defining a hollow structure at the rear end and a function of joining the left and right rear ends. Thereby the number of components of the seat frame can reduce. The center part of the cross plate is located at a position of the rear end close to the upper end. A seat catch, for example, to hold the seat therefore can be easily attached to this part.

According to the ninth aspect, the seat frame includes a rear cushion support (37) in front of the rear end (Ar) of the front part (A), the rear cushion support (37) supporting an upper end of the rear cushion (18). In this way, the embodiment places the support of the rear cushion at a position different from the place of coupling the front part and the rear part of the seat frame, and so can minimize the rigidity required for the coupling part between the front part and the rear part and can give higher flexibility of design.

According to the tenth aspect, the pipe member (40, 40a) of the rear part (B) has a diameter ($\phi 2$) smaller than a diameter ($\phi 1$) of the round pipe (F5) of the front part (A). This can achieve enough rigidity at the front part, and also can improve the design because the pipe member for a grab bar and a rear carrier has a smaller diameter.

DETAILED DESCRIPTION

Figure 1:
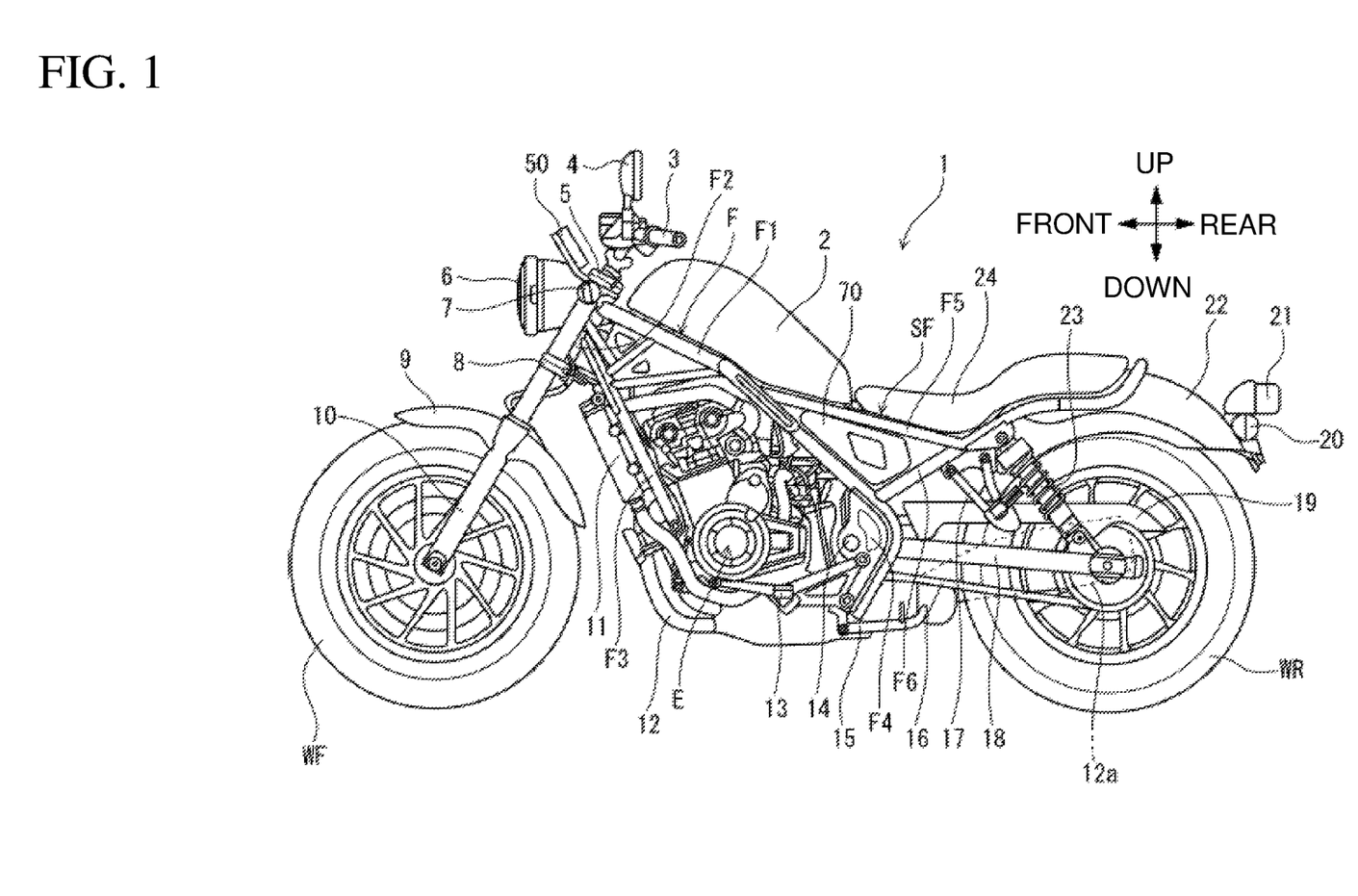
FIG. 1 is a left side view of a motorcycle including a seat frame for a saddled vehicle according to one embodiment of the present invention.

The following describes a preferred embodiment of the present invention in details with reference to the drawings. FIG. 1 is a left side view of a motorcycle 1 including a seat frame for a saddled vehicle according to one embodiment of the present invention. The vehicle body frame F of the motorcycle 1 includes a pair of left and right main frames F1 extending rearward and downward from a head pipe F2, a pair of left and right hanger frames F3 located below the main frames F1 and extending rearward and downward from the head pipe F2, and a pair of left and right pivot frames F4 each joining to a lower rear part of the corresponding main frame F1. The main frames F1 join to a seat frame SF at the rear part. The seat frame SF includes a pair of left and right upper pipes F5 and lower pipes F6, and extends rearward and upward.

The motorcycle includes an engine E supported between the main frames F1 and the hanger frames F3, and a radiator 11 in front of the hanger frames F3. Combustion gas in the engine E is emitted from a muffler 12a on the right in the vehicle width direction via an exhaust pipe 12. The motorcycle has a side stand 15 that is swingably supported at the lower end of the left pivot frame F4, and has a pair of left and right footrest steps 13 in front of the side stand 15.

Each pivot frame F4 supports a pivot 14, and the pivot 14 supports the front end of a swing arm 18 swingably. The driving force of the engine E is transmitted to a rear wheel WR via the drive chain 16. The rear wheel WR is rotatably supported at the rear end of the swing arm 18. The motorcycle includes a chain cover 19 above the swing arm 18, and the chain cover 19 covers the upper part of the drive chain 16. The rear part of the swing arm 18 is suspended from the seat frame SF via a pair of left and right rear cushions 23. A pair of left and right pillion step holders 17 is attached to the lower pipes F6 in front of the rear cushions 23.

A pair of left and right front forks 10 supports the front wheel WF rotatably, and is supported by a top bridge 5 and a bottom bridge 8 at the upper and lower positions of the head pipe F2. The head pipe F2 rotatably supports a stem shaft (not shown) that joins the top bridge 5 and the bottom bridge 8 at the upper and lower positions. The motorcycle includes a steering handle 3 fixed above the top bridge 5, and the steering handle 3 extends in the vehicle width direction. A rear view mirror 4 is attached to the steering handle 3. The top bridge 5 supports a meter unit 50, and the bottom bridge 8 supports a head light 6. The front forks 10 also support a pair of left and right front winker units 7 under the top bridge 5.

The main frame F1 supports a fuel tank 2 thereon. The motorcycle includes a seat 24 behind the fuel tank 2. The motorcycle has a side cover 70 under the seat 24 at a position surrounded by the main frames F1, the upper pipes F5 and the lower pipes F6. The motorcycle also has a rear fender 22 behind the seat 24. A rear lighting unit 21 and a pair of left and right rear winker units 20 are attached to the rear fender 22.

Figure 2:
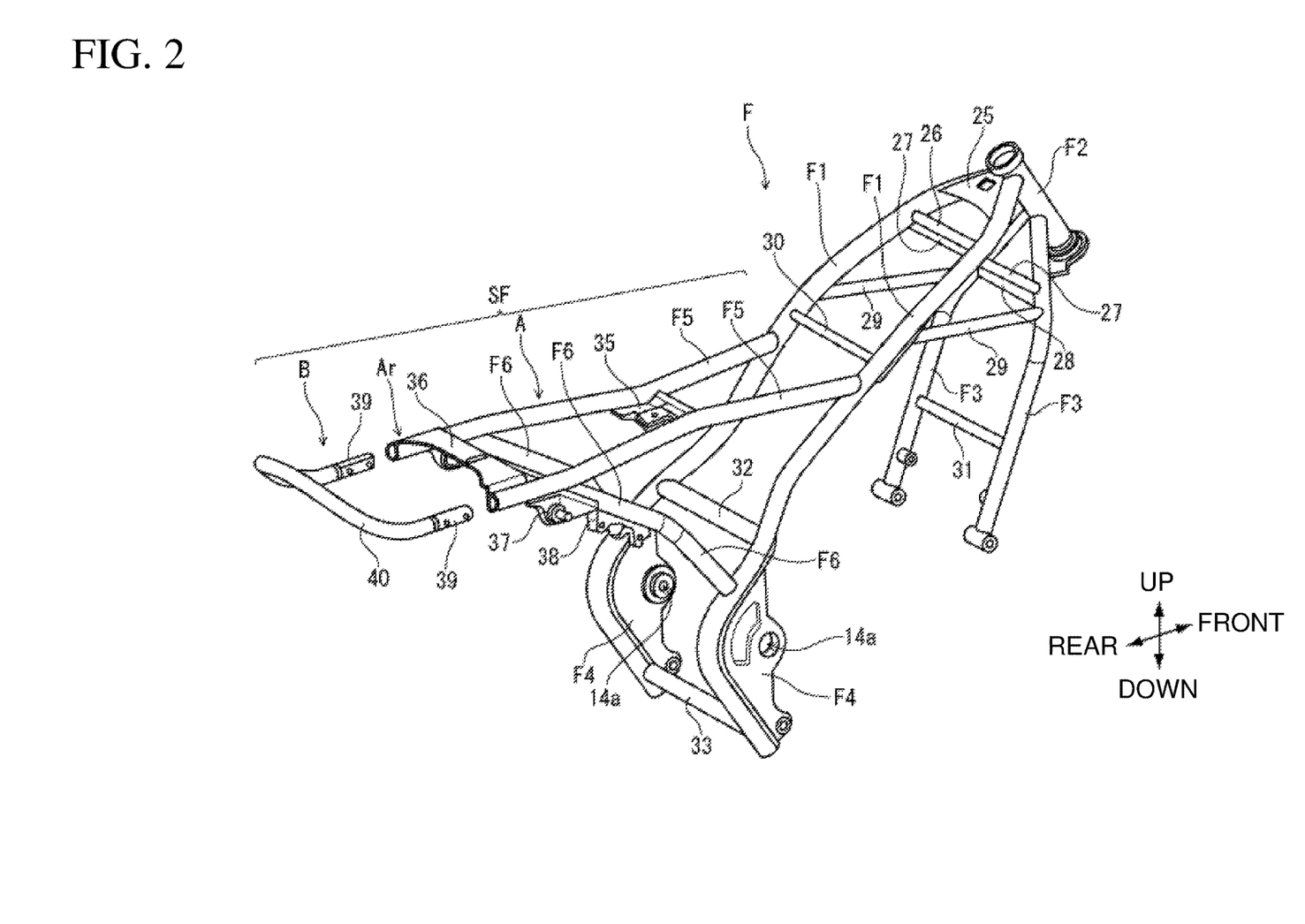
FIG. 2 is a perspective view of the vehicle body frame.
Figure 3:
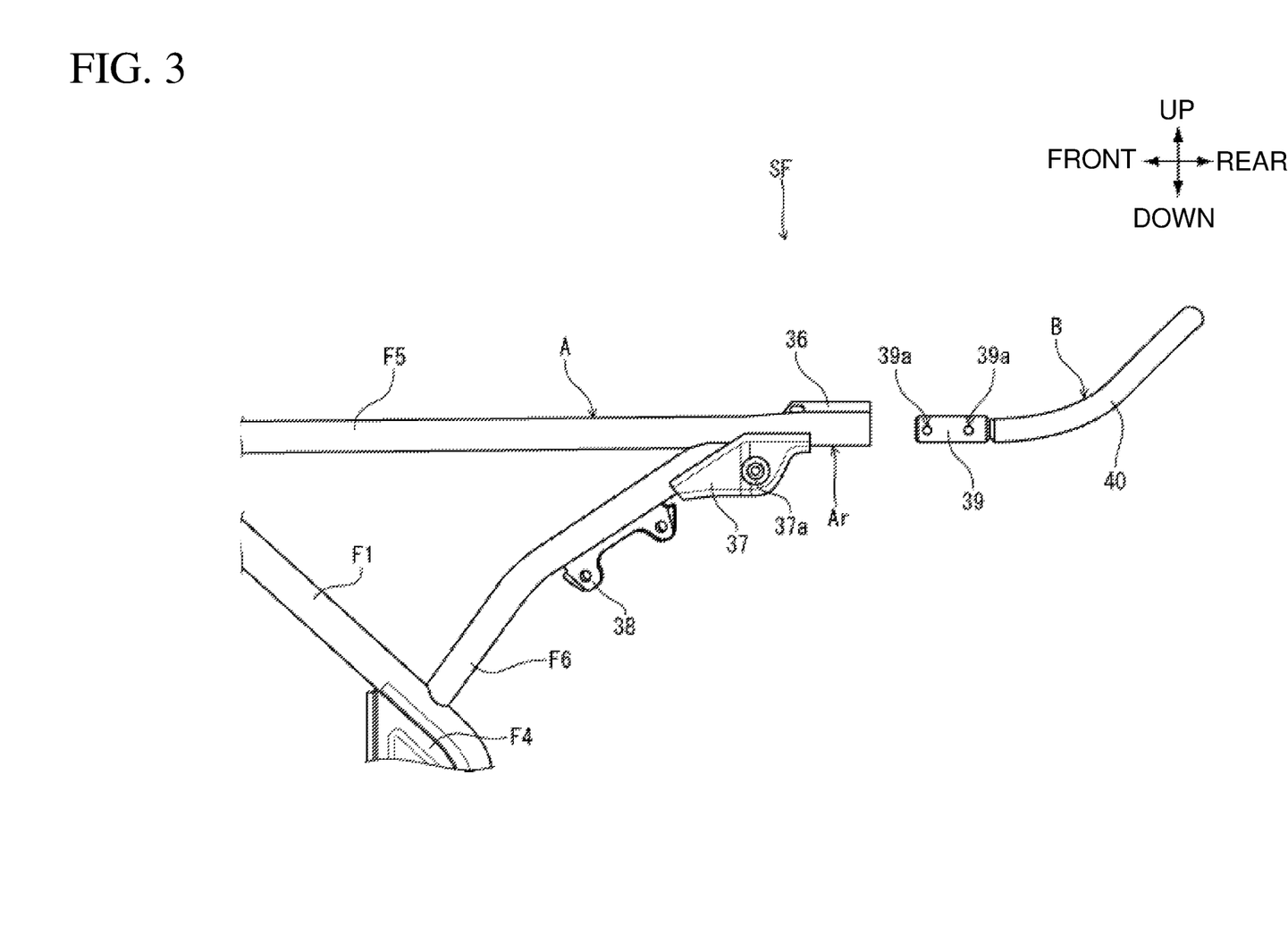
FIG. 3 is a left side view of the seat frame.

FIG. 2 is a perspective view of the vehicle body frame F. FIG. 3 is a left side view of the seat frame SF. The vehicle body frame F, mainly including the assembly of steel pipes, includes the pair of left and right main frames F1 and the pair of left and right hanger frames F3. The main frames F1 extend rearward and downward from the rear face of the head pipe F2 at a position closer to the upper end, and the hanger frames F3 extend rearward and downward from the head pipe F2 at a position close to the lower end. The left and right main frames H are joined by a first cross pipe 26, a second cross pipe 30, a third cross pipe 32 and a fourth cross pipe 33 that are disposed in this order from the front of the vehicle body. The left and right hanger frames F3 are joined by an upper cross pipe 28 and a lower cross pipe 31. The main frames F1 and the hanger frames F3 are joined by a front truss pipe 27 and a rear truss pipe 29 that define a truss structure. The pivot frames F4 each having a through hole 14a to support the pivot 14 are welded to the front faces of the main frames F1 at a position between the third cross pipe 32 and the fourth cross pipe 33.

The seat frame SF is welded to the main frames F1, and has a separable structure such that a rear part B can be disconnected from a front part A. The front part A has the pair of left and right upper pipes F5 and lower pipes F6. The left and right upper pipes F5 are joined via a fuel tank support 35 to attach a rear stay of the fuel tank 2. Each lower pipe F6 includes a step support 38 and a rear cushion support 37 behind the step support 38 on the lower face. The step supports 38 support the tandem step holders 17, and the rear cushion supports 37 support the upper ends of the rear cushions 23. Each rear cushion support 37 has a swing shaft 37a of the corresponding rear cushion 23. The rear cushion support 37 functions as a gusset as well to enhance the coupling rigidity between the upper pipe F5 and the lower pipe F6.

The present embodiment places the support of each rear cushion 23 at a position spaced forward from the position of coupling the front part A and the rear part B of the seat frame SF, and so can minimize the rigidity required for the coupling part between the front part A and the rear part B and can give higher flexibility of design.

A cross plate 36 extending in the vehicle width direction is welded to the rear end Ar of the front part A. The rear part B includes a pair of left and right engagement parts 39 that engages with the rear ends Ar of the front part A, and a pipe member 40 to be connected to the rear ends of the engagement parts 39. Each engagement part 39 has two screw holes 39a extending in the vehicle width direction.

Figure 4:
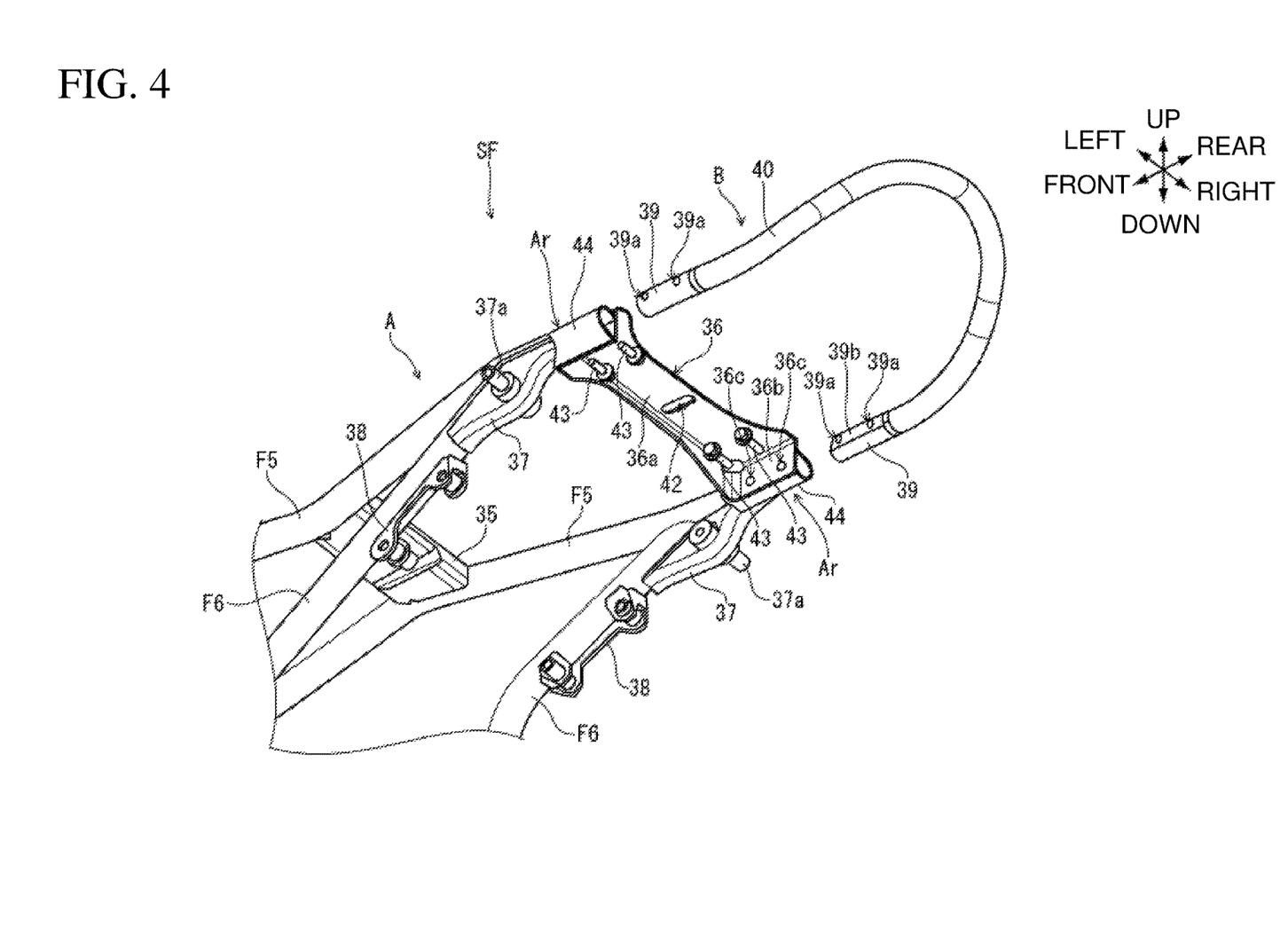
FIG. 4 is a perspective view of the seat frame viewed from the rear and below.

FIG. 4 is a perspective view of the seat frame SF viewed from the rear and below. The rear part B includes the engagement parts 39 having a solid structure, and the pipe member 40 welded to the rear ends of the engagement parts 39. In this example, the pipe member 40 functions as a grab bar. The rear ends Ar of the front part A have a hollow structure, into which the engagement parts 39 can be inserted. More specifically, each rear end Ar includes a lateral wall 36b extending downward from one end of the center part 36a of the cross plate 36 as a flat plate, and a curved wall 44 that is welded to this lateral wall 36b. Each lateral wall 36b has a through hole 36c, through which a bolt 43 as a fastening member passes. In the present embodiment, each engagement part 39 of the rear part B is inserted into the corresponding rear end Ar having a hollow structure, and then the bolt 43 is screwed from the inside of the vehicle width direction to couple the front part A and the rear part B. Each engagement part 39 may be prepared by removing a part of a round-pillar shaped solid member to form the flat part 39b on the inside in the vehicle width direction. The cross plate 36 has a through hole 42 at a center part 36a, through which a hook passes to engage with a not-illustrated seat catch.

As described above, the seat frame SF of the present invention is separable into the front part A fixed to the vehicle body frame F and the rear part B that is removably attached to the front part A. The front part A and the rear part B are fixed with the bolt 43 that engages from the inside in the vehicle width direction. In this way, the rear part B of the seat frame SF can be disconnected from the front part A, and so the rear part B only can be easily replaced with a short frame with an emphasis on design or with a long frame with an emphasis on the carrying capacity. This can enhance the flexibility of design of the seat frame SF as compared with an integrally formed seat frame SF. Additionally, the bolt 43 engaging from the inside in the vehicle width direction is hidden from the outside, and so can enhance the aesthetic aspect of the motorcycle 1.

Figure 5:
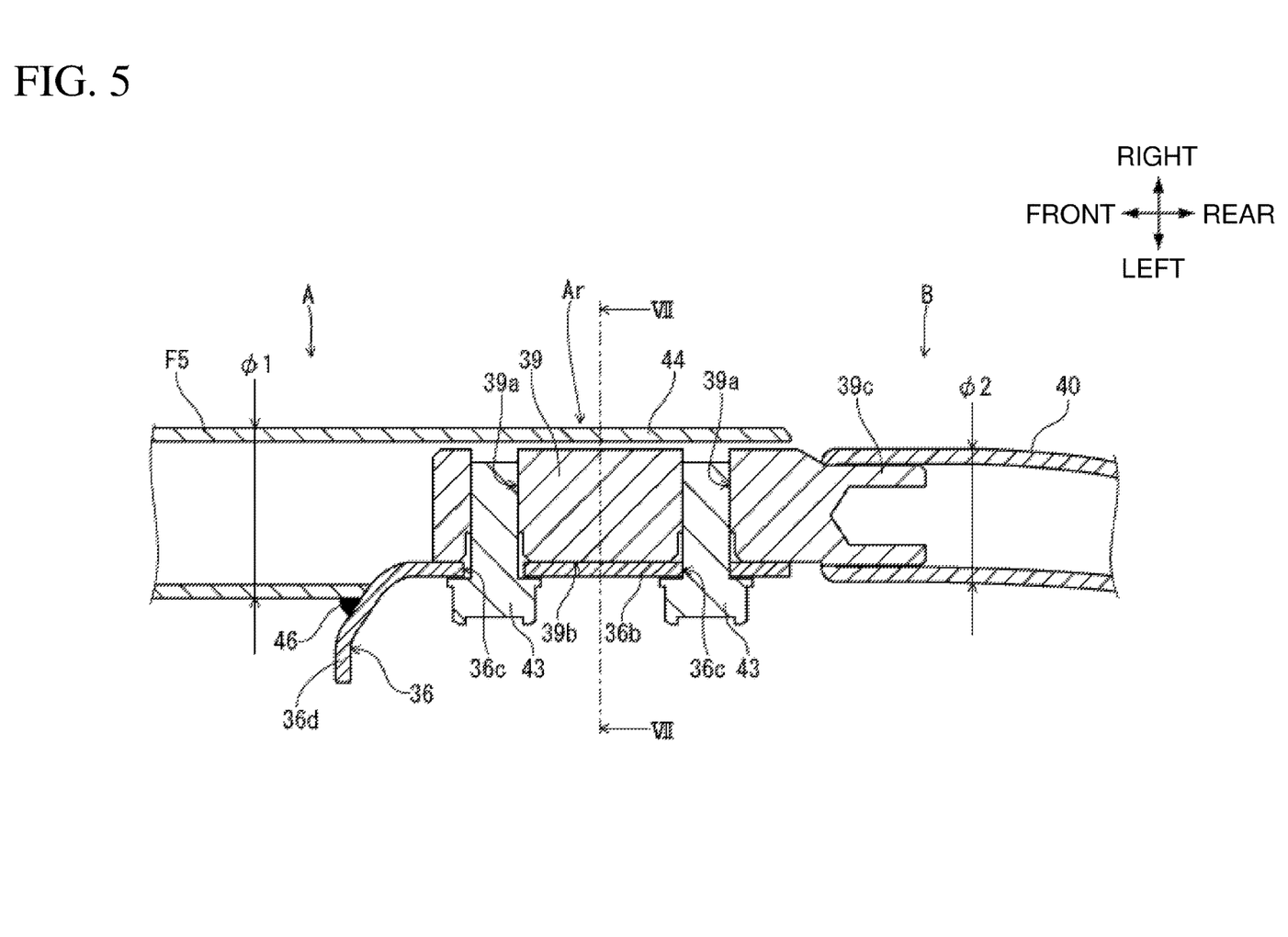
FIG. 5 is a cross-sectional view showing the coupling state between the front part and the rear part.
Figure 6:
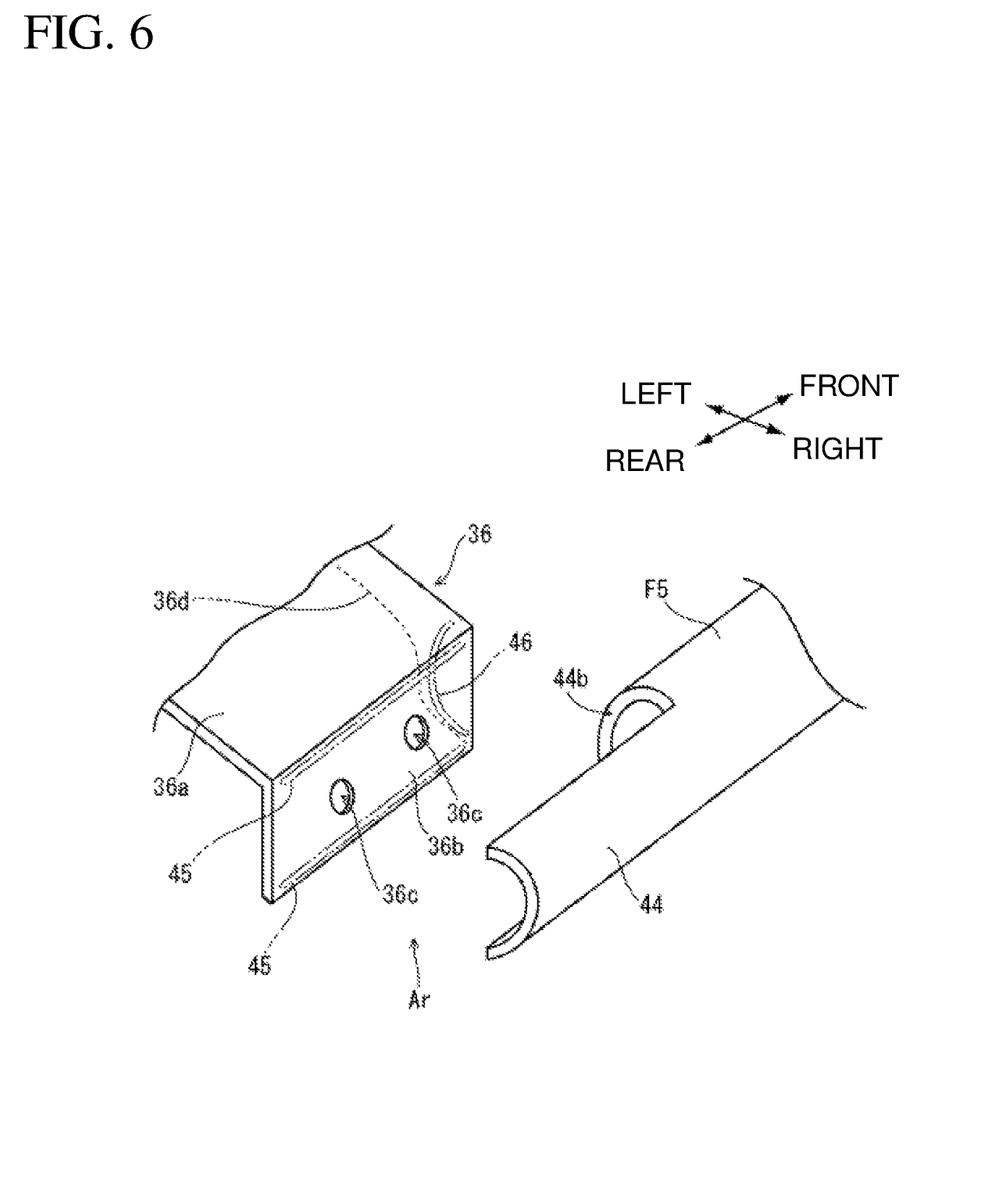
FIG. 6 is an exploded perspective view of the structure of the rear end.
Figure 7:
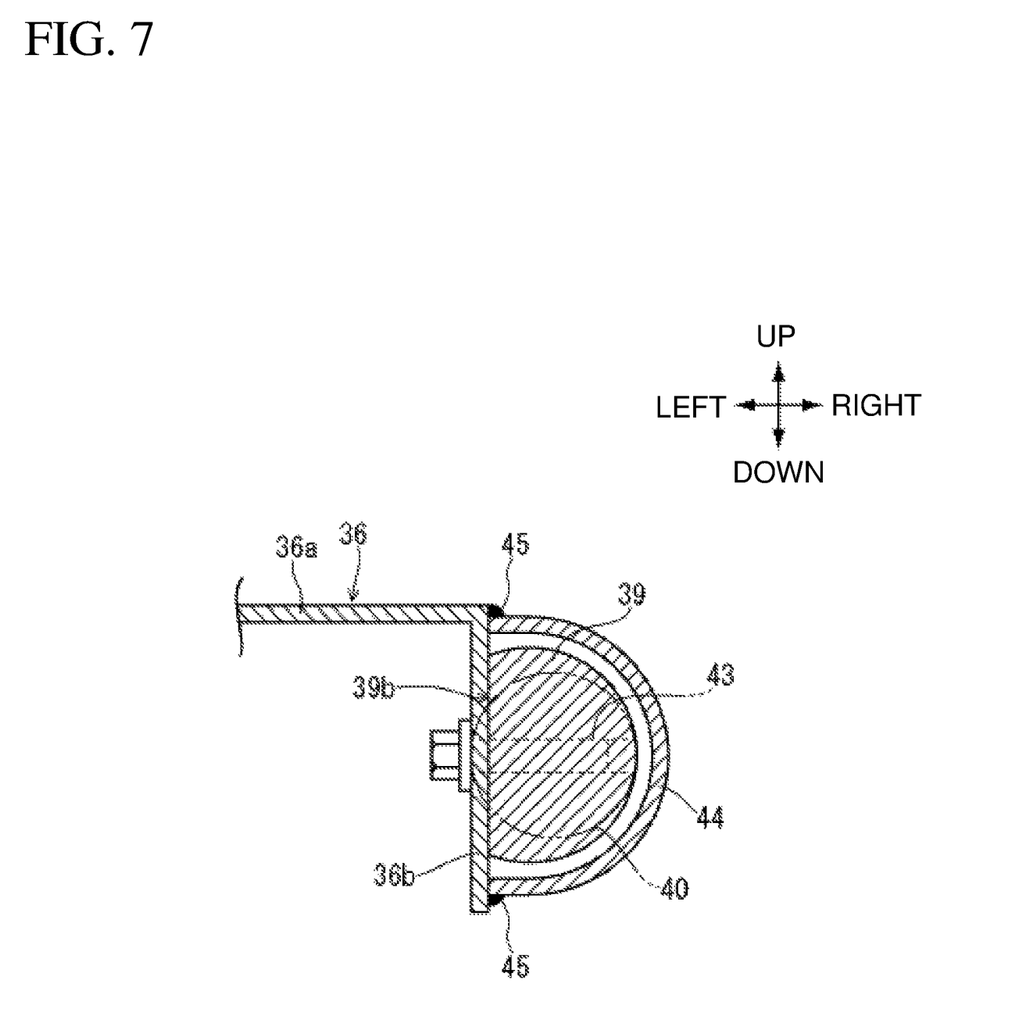
FIG. 7 is a cross-sectional view along the line VII-VII of FIG. 5.

FIG. 5 is a cross-sectional view showing the coupling state between the front part A and the rear part B. FIG. 6 is an exploded perspective view of the structure of the rear end Ar, and FIG. 7 is a cross-sectional view taken along the line VII-VII of FIG. 5. FIG. 5 shows a horizontal cross-sectional view of the rear end Ar on the right in the vehicle width direction.

As described above, the rear part B includes the engagement parts 39 having a solid structure, and the pipe member 40 fixed to the rear ends of the engagement parts 39. Each engagement part 39 has a fitting part 39c at the rear end and the fitting part 39c has a small diameter. These fitting parts 39c are inserted into the pipe member 40, followed by welding at the periphery to form the rear part B. This can enhance the rigidity at the engagement parts 39 and can make the rear part B lighter in weight. The bolts 43 are directly screwed to the engagement parts 39 so as to enhance the coupling rigidity of the front part A and the rear part B. The rear part B includes the pipe member 40 that is easily shaped, and so the flexibility of design at the rear part B increases.

The diameter φ2 of the pipe member 40 at the rear part B is smaller than the diameter φ1 of the upper pipe F5 of the front part A. This can achieve enough rigidity at the front part A, and also can improve the design because the pipe member 40 for a grab bar and a rear carrier has a smaller diameter.

As shown in FIG. 6, the curved wall 44 at the rear end Ar of the front part A is formed by removing a part of the upper pipe F5 on the inside in the vehicle width direction. In this way, the curved wall 44 can be formed by simple machining of cutting of a part of a round pipe, and so the number of man-hours can reduce. Each rear end Ar of the front part A includes this curved wall 44 and the lateral wall 36b of the cross plate 36 that are welded via beads 45. The rear end face 44b of the upper pipe F5 also is welded to the front lateral face 36d of the cross plate 36 via bead 46, whereby the coupling rigidity between them can increase more. In this way, the cross plate 36 makes up a part of the rear end Ar, whereby the rigidity can increase while reducing the number of components.

Each bolt 43 is inserted from the lateral wall 36b of the cross plate 36 in the vehicle width direction, and is screwed with the engagement part 39 having a solid structure. The bolt 43 is then tightened until the lateral face of the lateral wall 36b on the outside in the vehicle width direction comes into a surface contact with the flat part 39b of the corresponding engagement part 39. In this way, the cross plate and the engagement part can couple firmly without exposing the bolts 43 to the outside.

Figure 8:
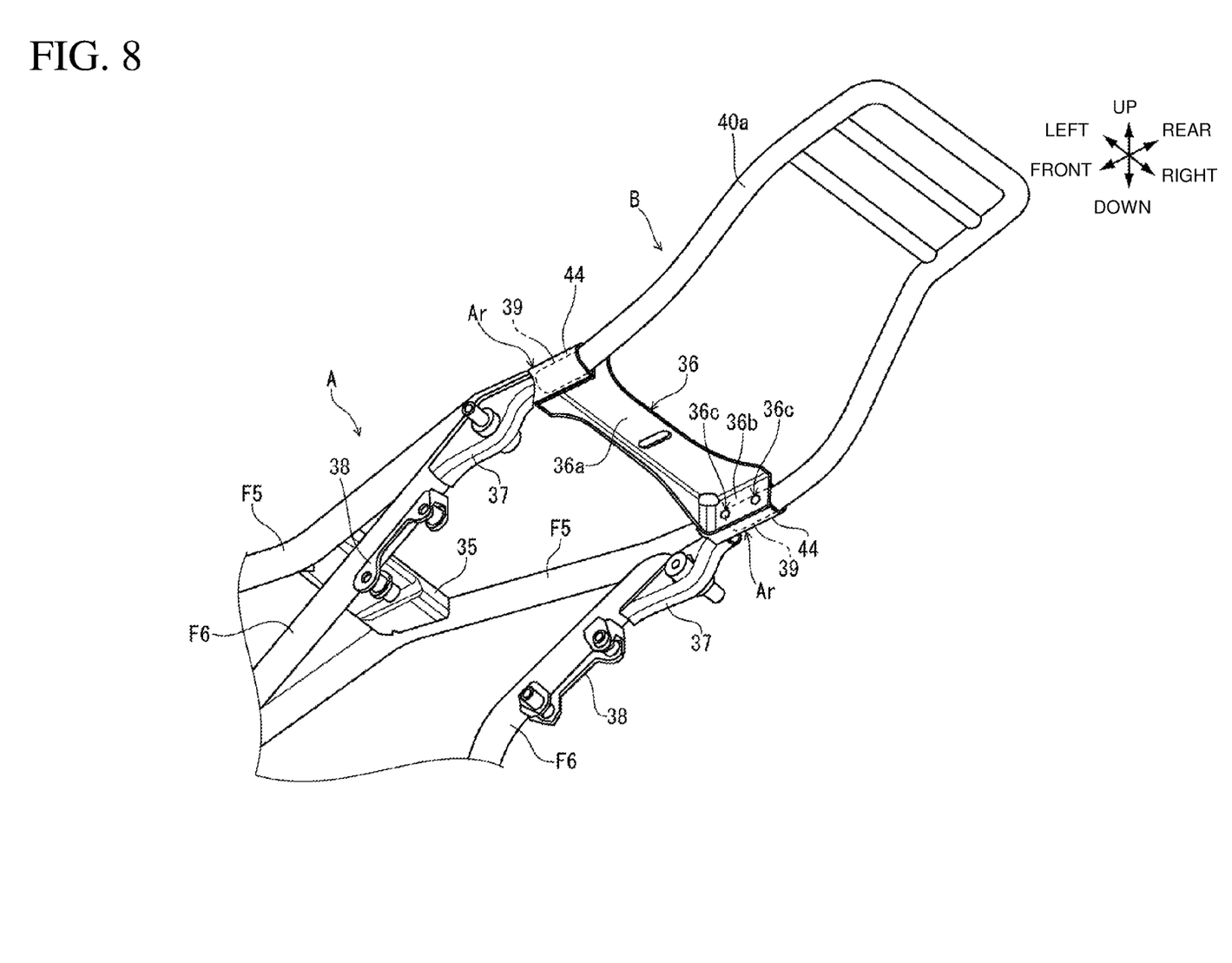
FIG. 8 is a perspective view of the seat frame including another part as the rear part.

FIG. 8 is a perspective view of the seat frame SF including another part as the rear part B. This drawing shows a rear carrier including a long pipe member 40a, and the pipe member can be modified variously, such as for a stay of a rear box or a member to support the lower back of the passenger. In this way, the seat frame SF of the present invention allows easy replacement of a rear part B to have various shapes.

Note here that the form of a saddled vehicle, the shape and the structure of the vehicle body frame, the thickness of a pipe for the vehicle body frame, the shape and the structure of the front part and the rear part of the seat frame, the shape and the structure of the engagement parts and the rear ends, the form of the fastening members, and the like are not limited to the above embodiment, and they may be changed variously. For instance, the pipe of the rear part may be a square pipe. The seat frame for the present invention is applicable to saddled vehicles other than motorcycles as well, such as a scooter-type vehicle having a low-floor type step floor and a three-wheeled or four-wheeled saddled vehicle having two front wheels or two rear wheels.

REFERENCE SIGNS LIST

1 Motorcycle (saddled vehicle)
23 Rear cushion
F Vehicle body frame
SF Seat frame
F5 Upper pipe (round pipe)
A Front part
B Rear part
Ar Rear end
29 Rear truss pipe
36 Cross plate
36b Lateral wall
36c Through hole
37 Rear cushion support
39 Engagement part
39b Flat part
40, 40a Pipe member
43 Bolt (fastening member)
44 Curved wall
φ1 Diameter of upper pipe
φ2 Diameter of pipe member at rear part

What is claimed is:

1. A saddled vehicle, comprising:
a vehicle body;
a seat supported on the vehicle body;
a vehicle body frame; and
a seat frame extending in a longitudinal direction rearward of the vehicle body from a rear part of the vehicle body frame, the seat frame comprising:
a front part fixed to the vehicle body frame, the front part including a pair of rear ends arranged on a left and a right of the front part, respectively;
a rear part detachably attached to the front part;
a cross plate extending in a lateral direction to join the left rear end and right rear end of the front part, the cross plate being a plate member having a flat center part extending in the lateral direction and lateral walls, each lateral wall being a flat plate respectively extending downward from a respective side of the center part; and
a fastening member fixing the front part and the rear part, the fastening member including a bolt,
wherein each of the left rear end and right rear end of the front part comprises a curved wall that has a substantially semi-circular cross section and is spaced from the lateral wall of the cross plate in a laterally outside direction to form a hollow structure extending in the longitudinal direction,
wherein the rear part includes an engagement part having a solid structure at a front end of the rear part, the engagement part being inserted into the hollow structure, and
wherein the fastening member fixes each of the lateral walls of the cross plate to the engagement part inserted into the respective hollow structure.

2. The saddled vehicle according to claim 1, wherein the rear part includes the engagement part and a pipe member to be connected to a rear part of the engagement part.

3. The saddled vehicle according to claim 2, wherein a rear cushion support is disposed in front of the rear end of the front part, the rear cushion support supporting an upper end of a rear cushion.

4. The saddled vehicle according to claim 1,
wherein each lateral wall has a through hole, through which the fastening member passes.

5. The saddled vehicle according to claim 4, wherein the front part includes a round pipe, and the curved wall is formed by removing a part of the round pipe on the inside in the lateral direction.

6. The saddled vehicle according to claim 5, wherein the engagement part has a flat part on the inside in the lateral direction, the flat part being formed by removing a part of a round-pillar shaped solid member.

7. The saddled vehicle according to claim 6, wherein a pipe member of the rear part has a diameter smaller than a diameter of the round pipe of the front part.

8. The saddled vehicle according to claim 5, wherein a pipe member of the rear part has a diameter smaller than a diameter of the round pipe of the front part.

9. The saddled vehicle according to claim 1, wherein a rear cushion support is disposed in front of the rear end of the front part, the rear cushion support supporting an upper end of a rear cushion.

10. The saddled vehicle according to claim 1, wherein the fastening member has a head and a shaft and the shaft extends outwardly from the head in a lateral direction relative to a centerline of the vehicle body.

11. The saddled vehicle according to claim 1, wherein the hollow structure has a D-shaped cross section.

12. The saddled vehicle according to claim 1, wherein a bottom edge of the seat is above the seat frame to expose a first surface of the seat frame, and
wherein the fastening member has a head and a shaft, the head contacting a second surface of the seat frame opposite the first surface of the seat frame.

* * * * *